United States Patent [19]
Ito et al.

[11] Patent Number: 5,447,352
[45] Date of Patent: Sep. 5, 1995

[54] SEAT SLIDE MECHANISM FOR VEHICLES

[75] Inventors: Sadao Ito, Anjyo; Hiroshi Nawa, Kariya, both of Japan

[73] Assignee: Aisin Seiki Kabushiki Kaisha, Japan

[21] Appl. No.: 78,815

[22] Filed: Jun. 21, 1993

[30] Foreign Application Priority Data

Jun. 22, 1992 [JP] Japan .................. 4-185734
Jun. 22, 1992 [JP] Japan .................. 4-185737

[51] Int. Cl.⁶ .............................................. F16M 13/00
[52] U.S. Cl. .................................. 296/65.1; 248/429; 248/424
[58] Field of Search ............... 296/65.1; 248/429, 430, 248/424; 74/425, 89.15, 89.14; 297/346

[56] References Cited

U.S. PATENT DOCUMENTS

| | | | |
|---|---|---|---|
| 5,048,886 | 9/1991 | Ito et al. ................. | 296/65.1 |
| 5,121,895 | 6/1992 | Ikegaya et al. .......... | 248/420 |
| 5,150,872 | 9/1992 | Isomura .................. | 248/429 |
| 5,316,258 | 5/1994 | Gauger et al. ........... | 248/429 X |
| 5,342,013 | 8/1994 | Ito et al. ................. | 248/429 |

FOREIGN PATENT DOCUMENTS 64-9043 1/1989 Japan .
3-112729 5/1991 Japan .

*Primary Examiner*—Joseph D. Pape
*Attorney, Agent, or Firm*—Finnegan, Henderson, Farabow, Garrett & Dunner

[57] ABSTRACT

A seat slide mechanism for vehicles includes a screw member extending longitudinally within an interior portion of the upper rail and a nut member engaging with the screw member. The nut member extends downwardly between the opposed walls of the upper rail to the base of the lower rail to form separated spaces at the both sides of the nut member and between laterally elongated slide members of the upper rail and the base portion of the lower rail. These separated spaces are helpful in arranging the rollers without any interference with the nut member or the screw member.

3 Claims, 3 Drawing Sheets

SEAT SLIDE MECHANISM FOR VEHICLES

BACKGROUND OF THE INVENTION

1. Field of the Invention

This invention relates to a seat slide mechanism for vehicles, particularly to a seat slide mechanism having an upper rail slidable with respect to a lower rail fixed to a vehicle floor and being provided for the fore-and-aft adjustment of the seat of the vehicle.

2. Description of the Prior Art

Japanese Laid Open (KOKAI) Publication No. 112729/1991 describes a seat slide mechanism having an upper rail for attachment to a seat cushion frame, a lower rail secured to the vehicle floor, a screw nut assembly for sliding the upper rail in the fore-and-aft direction along the lower rail by actuating an electric motor so as to ensure a desired attitude of the seated individual, and rollers or balls disposed in a space formed by both the rails to contact the surfaces thereof and decrease the sliding friction between both the rails.

The upper rail is of a generally inverted U-shaped cross section and the lower rail is of a generally U-shaped cross section. The rollers are arranged in spaces formed at front and rear portions of the inverted U-shaped body in section and the U-shaped body in section of both the opposed rails. The balls are disposed in a space between opposed lateral elongations of the upper rail and the lower rail to slidably contact these elongations through the balls.

The front rollers are laterally spaced and positioned at a portion in advance of the nut member of the screw nut assembly so that the screw member of the screw nut assembly is free from the front rollers. Therefore, for the purpose of arranging the space for the front rollers, the front portion of the lower rail must be extended in a forward direction as long as possible.

The movement of the front rollers is independent of the movement of the rear rollers and these movements of the rollers are free from the roll of the balls, so that the dimensions between the rollers or relative positions of the rollers and the balls are not kept constant and the upper rail will not slide smoothly with respect to the lower rail.

SUMMARY OF THE INVENTION

Accordingly, an object of the present invention is to provide a seat slide mechanism for vehicles which has a shortened lower rail in length and a smooth sliding movement of the upper rail along the lower rail while eliminating the above-mentioned disadvantages or drawbacks encountered in the prior art.

Another object of the present invention is to provide a seat slide mechanism having a basic construction that a screw member of the screw nut assembly extends in a longitudinal direction within an interior portion of the upper rail and a nut member which is mated with the screw is secured to a basic plate portion of the lower rail through a central lower opening of the upper rail, so that separated spaces for roller tracks are formed at both sides of the nut and between the base portion of the lower rail and laterally elongated slide members of the upper rail.

To achieve the objects and in accordance with the purpose of the invention, as embodied and broadly described herein, the seat slide mechanism of the invention comprises an upper rail for attachment to a vehicle seat, a screw nut assembly, said upper rail supporting said screw nut assembly, said screw nut assembly including a screw member and a nut member, a lower rail for attachment to a vehicle floor, and having a base portion to which said nut member of said screw nut assembly is secured, said upper rail being slidably attached to the lower rail and having an inverted generally U-shaped cross section for disposing said screw member therein and housing said nut member, said upper rail having opposed side walls and slidable strips, each of a generally U-shaped cross section laterally outwardly extending from the opposed side walls, said lower rail having opposed slidable portions each having an inverted generally L-shaped cross section upwardly extending from said base portion, a pair of roller guides disposed between the slidable strips of said upper rail and the base portion of said lower rail, rollers rotably supported on front and rear ends of each of said roller guides, and a plurality of shoes secured to the slidable portions of said lower rail and engaging the slidable strips of said upper rail.

In accordance with another aspect of the invention, as embodied and broadly described herein, the seat slide mechanism of the invention comprises a lower rail for attachment to a vehicle floor, an upper rail, for attachment to a vehicle seat, slidably attached to said lower rail and provided at an end with a gear box, a screw member housed in the upper rail and connected for rotation by said gear box, and a nut member which is meshed with the screw member, said upper rail having a main body in the form of an inverted generally U-shaped cross section and including opposed side walls, and slidable strips in the form of a generally U-shaped cross section which extend laterally outwardly from the opposed side walls, said lower rail having a base portion for supporting and securing said nut member and opposed slidable portions in the form of a generally L-shaped cross section upwardly extending from both sides of said base portion to define longitudinally extending spaces at opposite sides of said nut member between said slidable strips and said base portion, and rollers disposed in said spaces, said slidable strips engaging said slidable portions.

When a screw nut assembly is actuated by an electric motor, a rotation of the screw member of the screw nut assembly causes the upper rail to be moved in the fore-and-aft direction along the lower rail because a nut member which engages with the screw member is fixed to the lower rail. Rollers between both the rails are disposed at both ends of the base portion of the lower rail and rotatably held at front and rear ends of a pair of the roller guides, so that relative portions between the rollers and the rails and the rollers are constant and smooth movement of the upper rail along the lower rail is established.

The spaces between the slidable strips of the upper rail and the base portion of the lower rail are effectively utilized free from rotation of the screw member and position of the nut member, so that proper positions for arrangement of the rollers are provided.

The rollers of a right side and a left side are not connected to each other and hence a longitudinal length of the lower rail can be shortened. It is noted that the rollers can be disposed free from the position of the nut member and a shortened screw member in length can be used. An assembly of a seat slide mechanism according to the present invention becomes easier because the gear box and the screw nut assembly can be attached to the upper rail after the upper rail is slidably secured to the lower rail.

BRIEF DESCRIPTION OF THE DRAWINGS

These and other objects and features of the invention will become more clear with reference to the attached drawings which illustrate preferred embodiments of the invention, in which.

DETAILED DESCRIPTION OF THE PREFERRED EMBODIMENTS

Figure 1:
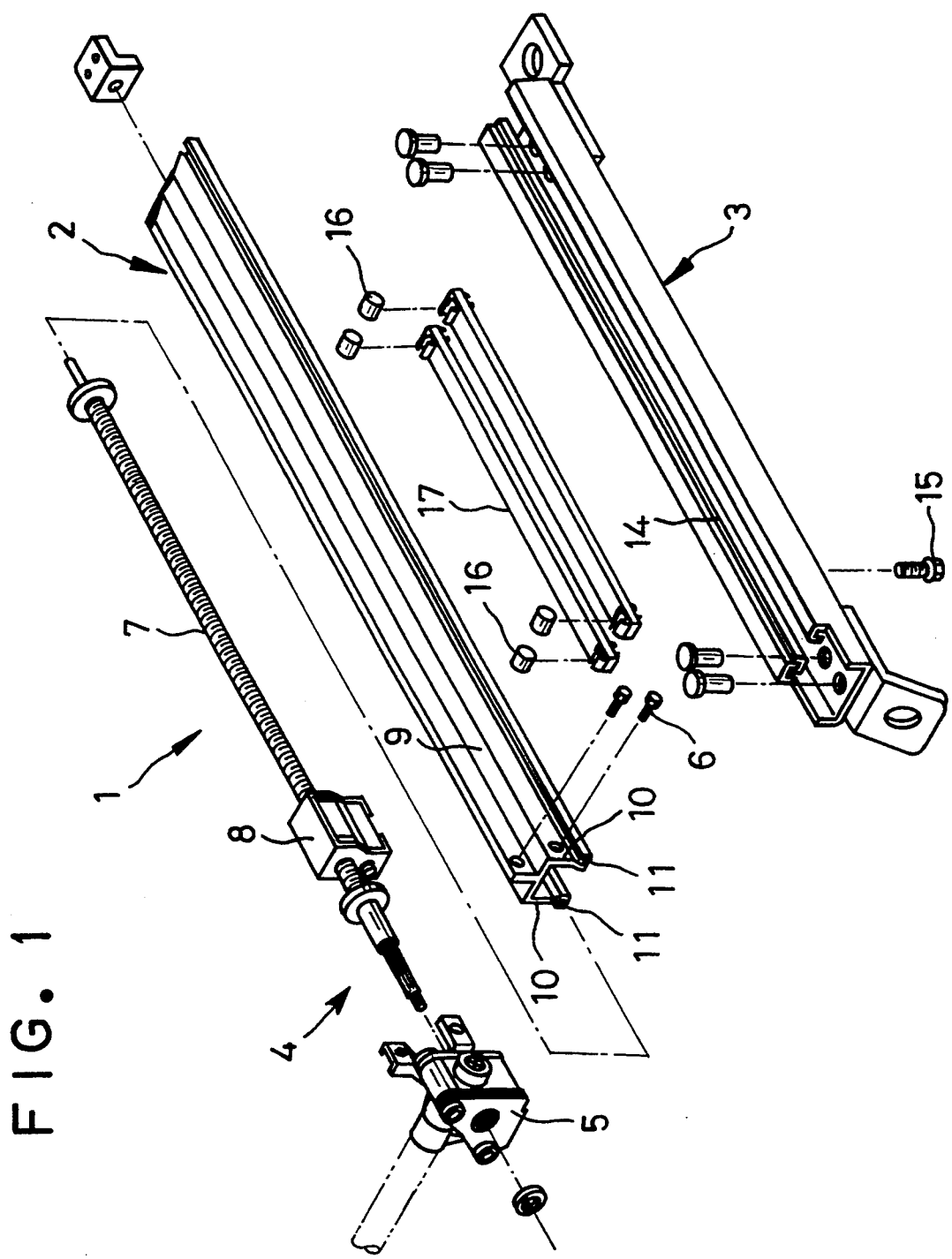
FIG. 1 is a perspective view of the seat slide mechanism according to the present invention.
Figure 2:
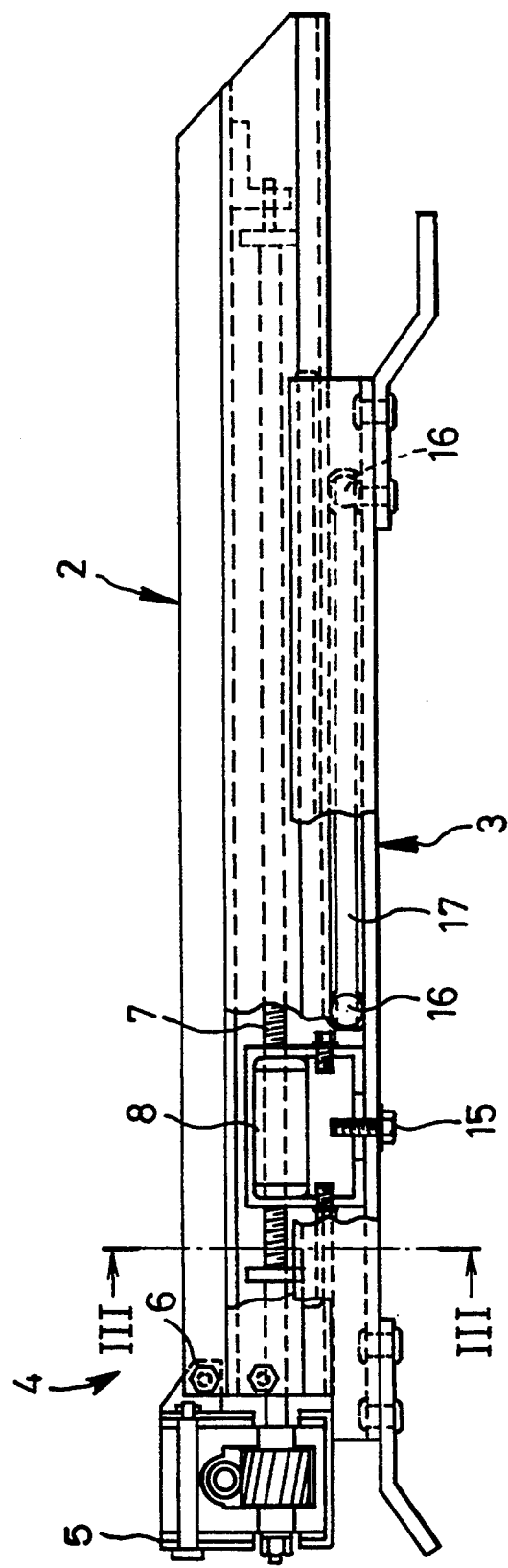
FIG. 2 is a partial cross-sectional side view of the seat slide mechanism.
Figure 3:
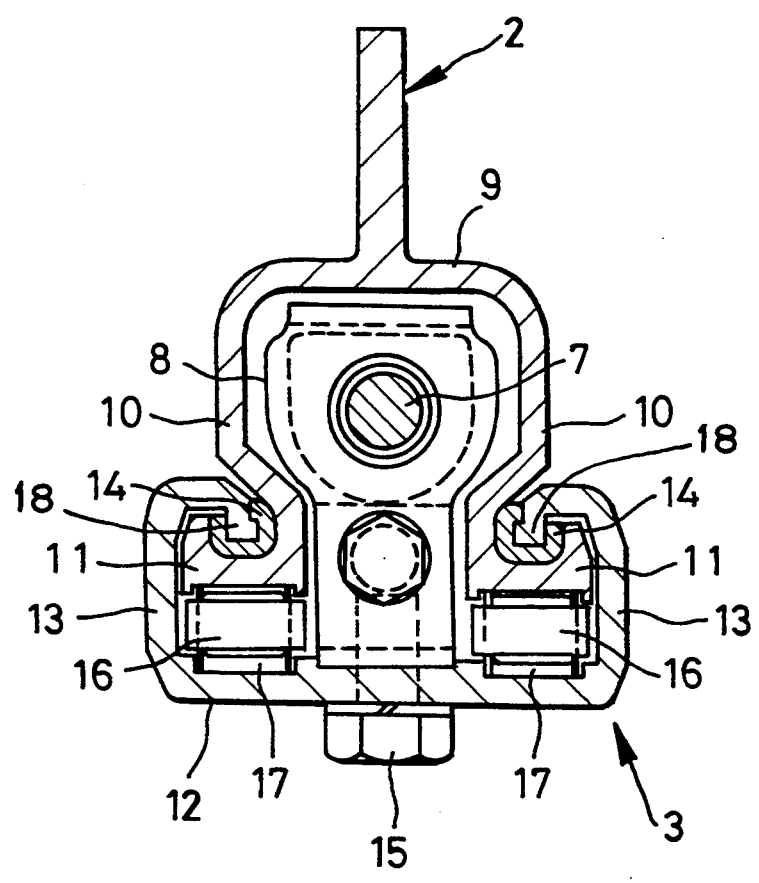
FIG. 3 is a cross section taken along the line III—III of FIG. 2.

Referring now to a preferred embodiment according to the present, invention, a seat slide mechanism is shown in FIGS. 1-3. The seat slide mechanism 1 includes a lower rail 3 fixed to a vehicle floor, an upper rail 2 for attachment to a seat of the vehicle and slidably attached to the lower rail 3, and a screw nut member 4.

The screw nut member 4 has a gear box 5 fixed to a front end of the upper rail 2 by means of screws 6, a longitudinally extending screw member 7 meshed with the gear box 5 at a front portion of the screw member 7 and rotatably supported at a rear portion thereof to a rear portion of the upper rail 2, and a nut member 8 engaging with the screw member 7 and secured to the lower rail 3. The gear box 5 includes a worm and a worm wheel which are actuated by an electric motor (not shown).

The upper rail 2 has a generally inverted U-shaped portion 9 in section for receiving the screw member 7 and the nut member 8, and generally U-shaped portions (slidable strips) 11 in section laterally outwardly extending from lower portions of the opposed walls 10 forming the inverted U-shaped portion 9 in section.

The lower rail 3 has a flat base portion 12 and generally inverted L-shaped portion 13 in section upwardly extending from both ends of the base portion 12. A plurality of shoes 14 formed of a synthetic resin is provided on lower portions (slidable members) 18 of the inverted L-shaped portions 13 in section in laterally spaced relation and is engaged with upper openings of the U-shaped portion 11 in section of the upper rail 2 to establish a smooth sliding of the upper rail 2 along the lower rail 3 in the fore-and-aft direction.

The nut member 8 extends downwardly between the opposed walls 10 of the upper rail 2 and is fixed to the base portion 12 by a bolt 15.

A pair of rail guides 17 are made of a metal plate having holes at its front and rear portions in which rollers 16 are housed, respectively. Each rail guide 17 is arranged between each U-shaped portion 11 in section of the upper rail 2 and the base portion 12 and extends longitudinally along the sides of the nut member 8. The rail guides 17 are not fixed to any one of the rails 2, 3 and are slidable between both the rails 2, 3.

While the rotation of the screw member 7 of the screw nut assembly 4 causes the upper rail 2 to be moved along the lower rail 3 in the fore-and-aft direction, the longitudinal distance between the front roller 16 and the rear roller 16 is kept constant by the roller guide 17 and a lateral distance between the right roller 16 and the left roller 16 is kept constantly without any interference with the screw member 7 or the nut member 8. This is effective in eliminating a play of the upper rail 2 with respect to the lower rail 3.

The present invention, in its broader aspects, is not limited to the specific details shown and described and will be rather defined by the claims and their equivalents. Departures may be made from the details described herein without departing from the scope of the invention.

We claim:

1. A seat slide mechanism comprising:

an upper rail for attachment to a vehicle seat, a screw nut assembly including a screw member held by said upper rail and a nut member, a lower rail for attachment to a vehicle floor, and having a base portion to which said nut member of said screw nut assembly is secured, said upper rail being slidably attached to the lower rail and having an inverted generally U-shaped cross section for disposing said screw member therein and housing said nut member, said upper rail having opposed side walls and slidable strips, each of a generally U-shaped cross section laterally outwardly extending from said side walls, said lower rail having opposed portions each having an inverted generally L-shaped cross section upwardly extending from said base portion, a pair of roller guides disposed between the slidable strips of said upper rail and the base portion of said lower rail, rollers rotably supported on front and rear ends of each of said roller guides, and a plurality of shoes secured to the opposed portions of said lower rail and engaging the slidable strips of said upper rail.

2. A seat slide mechanism according to claim 1, wherein said slidable strips extend outwardly from the lower portions of the opposed side walls of said upper rail.

3. A seat slide mechanism comprising:

a lower rail for attachment to a vehicle floor, an upper rail for attachment to a vehicle seat slidably attached to said lower rail and provided at an end with a gear box, a screw member housed in the upper rail and connected for rotation by said gear box, and a nut member which is meshed with the screw member, said upper rail having a main body in the form of an inverted generally U-shaped cross section and including opposed side walls, and slidable strips in the form of a generally U-shaped cross section which extend laterally outwardly from the opposed side walls, said lower rail having a base portion for supporting and securing said nut member and opposed portions in the form of a generally L-shaped cross section upwardly extending from both sides of said base portion to define longitudinally extending spaces at opposite sides of said nut member between said slidable strips and said base portion, a pair of longitudinally extending roller guides in said spaces and a plurality of rollers rotatably supported on each of said roller guides, said slidable strips engaging said opposed portions.

* * * * *